(12) United States Patent
Hoose

(10) Patent No.: US 6,637,559 B2
(45) Date of Patent: Oct. 28, 2003

(54) VEHICLE SUSPENSION AND BEARING THEREFOR

(76) Inventor: Howard Hoose, Onesquethaw Creek Rd., Feura Bush, NY (US) 12067

( * ) Notice: Subject to any disclaimer, the term of this patent is extended or adjusted under 35 U.S.C. 154(b) by 77 days.

(21) Appl. No.: 09/886,716

(22) Filed: Jun. 21, 2001

(65) Prior Publication Data

US 2002/0195755 A1 Dec. 26, 2002

(51) Int. Cl.[7] .................................................. F16F 9/36
(52) U.S. Cl. .......................... 188/322.16; 188/322.19; 384/49; 280/276
(58) Field of Search ............................. 384/49, 51, 55; 464/167, 168; 280/276; 188/322.16, 322.19

(56) References Cited

U.S. PATENT DOCUMENTS

| | | |
|---|---|---|
| 3,112,625 A | 12/1963 | Leto |
| 3,631,765 A | 1/1972 | Neumeister |
| 3,908,400 A * | 9/1975 | Takahashi et al. ........... 464/144 |
| 4,006,608 A * | 2/1977 | Vuceta .................... 192/56.57 |
| 4,306,638 A | 12/1981 | Malott |
| 4,548,305 A * | 10/1985 | Anderson ................. 192/56.54 |
| 4,660,683 A | 4/1987 | Hayashi et al. |
| 4,705,491 A * | 11/1987 | Andersson ................... 464/167 |
| 5,044,648 A | 9/1991 | Knapp |
| 5,290,107 A * | 3/1994 | Hanaway ...................... 384/49 |
| 5,380,026 A | 1/1995 | Robinson |
| 5,725,226 A | 3/1998 | Cabrerizo-Pariente |
| 6,017,047 A * | 1/2000 | Hoose ......................... 280/276 |
| 6,200,225 B1 * | 3/2001 | Hobaugh, II ................. 384/49 |
| 6,241,391 B1 * | 6/2001 | Hoose .................. 188/322.16 |
| 6,343,993 B1 * | 2/2002 | Duval et al. ................... 384/49 |
| 6,371,263 B1 * | 4/2002 | Hoose ........................ 188/312 |

* cited by examiner

*Primary Examiner*—Jack Lavinder
*Assistant Examiner*—Robert A. Siconolfi
(74) *Attorney, Agent, or Firm*—Hoffman, Warnick & D'Alessandro LLC; Spencer K. Warnick

(57) ABSTRACT

A vehicle suspension and bearing therefor providing improved slidability of members and torque resistance. The bearing includes a first member with at least one guide track, a second member with rolling element openings and a collar positioned within the second member to rotatably receive rolling elements positioned within the rolling element openings and guided by the at least one guide track. Another embodiment includes rolling element holders.

30 Claims, 12 Drawing Sheets

VEHICLE SUSPENSION AND BEARING THEREFOR

This application is related to U.S. Ser. No. 09/421,579, filed Oct. 20, 1999, currently pending, which is a continuation-in-part of U.S. Ser. No. 08/848,517, now U.S. Pat. No. 6,017,047 B1. This application is also related to U.S. Ser. No. 09/421,577, filed Oct. 20, 1999, now U.S. Pat. No. 6,241,391 B1, which is also a continuation-in-part of U.S. Ser. No. 08/848,517, now U.S. Pat. No. 6,017,047 B1.

BACKGROUND OF THE INVENTION

1. Technical Field

The present invention relates generally to a suspension and bearing therefor. More particularly, the present invention relates to a suspension and bearing with improved torque resistance and slidability.

2. Related Art

A disadvantage of current vehicle suspensions and related bearing structures is their inability to adequately prevent torque transmission to the suspension and still operate correctly. Inoperativeness is created by twisting of the telescopic suspension members to an extent that they do not slide smoothly relative to one another.

In view of the foregoing, there is a need in the art for a suspension and bearing capable of resisting torque and providing improved slidability.

SUMMARY OF THE INVENTION

It is an advantage of the present invention to overcome the above mentioned deficiencies in the related art. In order to achieve this, the present invention provides in a first aspect a bearing comprising: a first member having at least one bearing track, each bearing track adapted to rotatably guide a rolling element received therein; a second member telescopically arranged with the first member; an extension member coupled to the second member, the extension member including a first recess; a first rolling element holder seated in the first recess for rotatably holding a first rolling element in registration with a bearing track of the first member; a second rolling element holder seated in the first recess for rotatably holding a second rolling element in registration with a bearing track of the first member; and means for transferring linear force applied between the first and second members to opposing rotational forces on the first and second rolling elements.

A second aspect of the invention is directed to a vehicle suspension adapted to be coupled to a ground engaging member comprising: a first member having at least one bearing track, each bearing track adapted to rotatably guide a rolling element received therein; a second member telescopically arranged with the first member; an extension member coupled to the second member, the extension member including a first recess; a first rolling element holder seated in the first recess for rotatably holding a first rolling element in registration with a bearing track of the first member; a second rolling element holder seated in the first recess for rotatably holding a second rolling element in registration with a bearing track of the first member; and means for transferring linear force applied between the first and second members to opposing rotational forces on the first and second rolling elements, wherein one of the first and second members is coupled to a ground engaging member and the other member is coupled to a frame of a vehicle.

A third aspect of the invention is directed to a bearing comprising: a stationary outer member having at least two bearing tracks on an interior of the stationary outer member; a bearing track race received in each bearing track to compensate for wear of the bearing track and rotatably guide a rolling element received therein; a moving inner member telescopically arranged with the stationary outer member; an extension member coupled to the moving inner member, the extension member having a first recess in an exterior surface thereof; a first rolling element holder seated in the first recess for rotatably holding a first rolling element in registration with each bearing track of the first member, a second rolling element holder seated in the first recess for rotatably holding a second rolling element in registration with each bearing track of the first member; and means for transferring linear force applied between the stationary and moving members to opposing rotational forces on the first and second rolling elements.

A fourth aspect of the invention provides a bearing comprising: a first member having a bearing track for rotatably receiving at least two rolling elements; a second member telescopically received in the first member and having at least two elongate openings; a first collar positioned within the second member for rotatably supporting at least one rolling element; a second collar positioned within the second member for rotatably supporting at least one rolling element; a rolling element extending through each elongate opening to be rotatably supported by one of the first and second collars and engage the bearing track; and a rotational counteracting mechanism to force the first holder and the second holder in opposing rotational directions.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

While the present invention will be described in conjunction with a two wheeled vehicle, e.g., a motorcycle or bicycle, it should be noted that the invention may be utilized in a variety of vehicle suspensions not illustrated herein. Furthermore, while embodiments of the invention are illustrated for use with one of a front fork or rear suspension of a two-wheeled vehicle, it should be noted that the invention is equally applicable to either the front or rear suspension of a vehicle.

Referring to FIGS. 1–7, an embodiment of a bearing 180 is shown. While bearing 180 will be described in the setting of a vehicle suspension, it should be recognized that bearing 180 is described in this setting for illustrative purposes only, i.e., it has other uses beyond a vehicle suspension.

Figure 1:
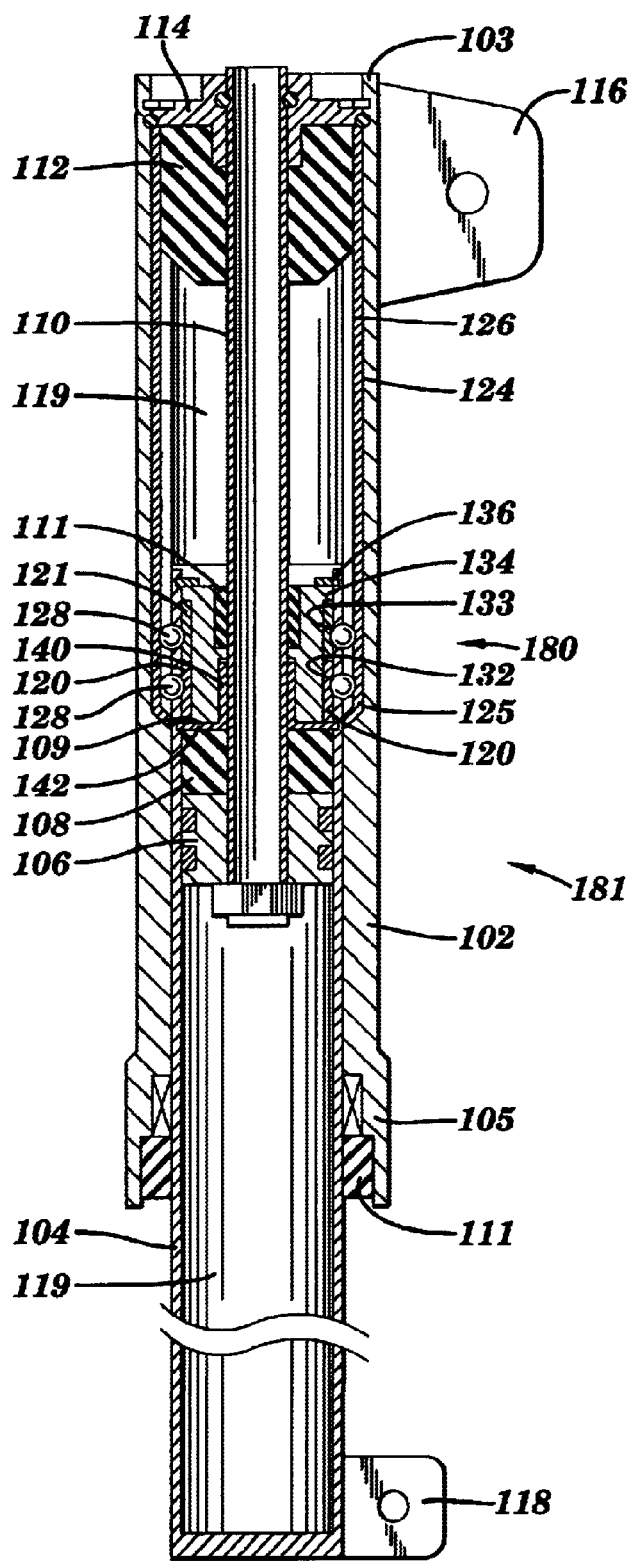
FIG. 1 shows a cross-sectional view of a suspension and bearing in accordance with a first embodiment of the present invention.
Figure 2:
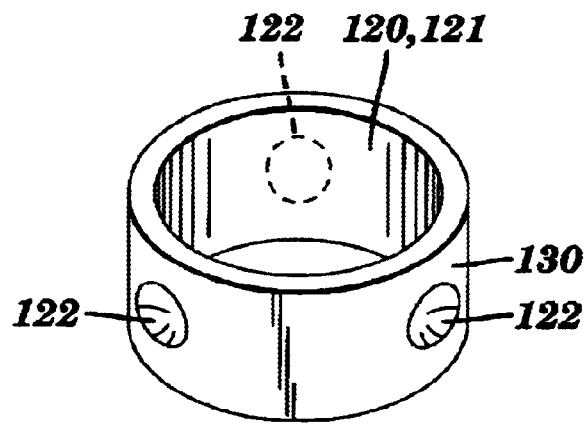
FIG. 2 shows an isometric view of a collar shown in FIG. 1.
Figure 3:
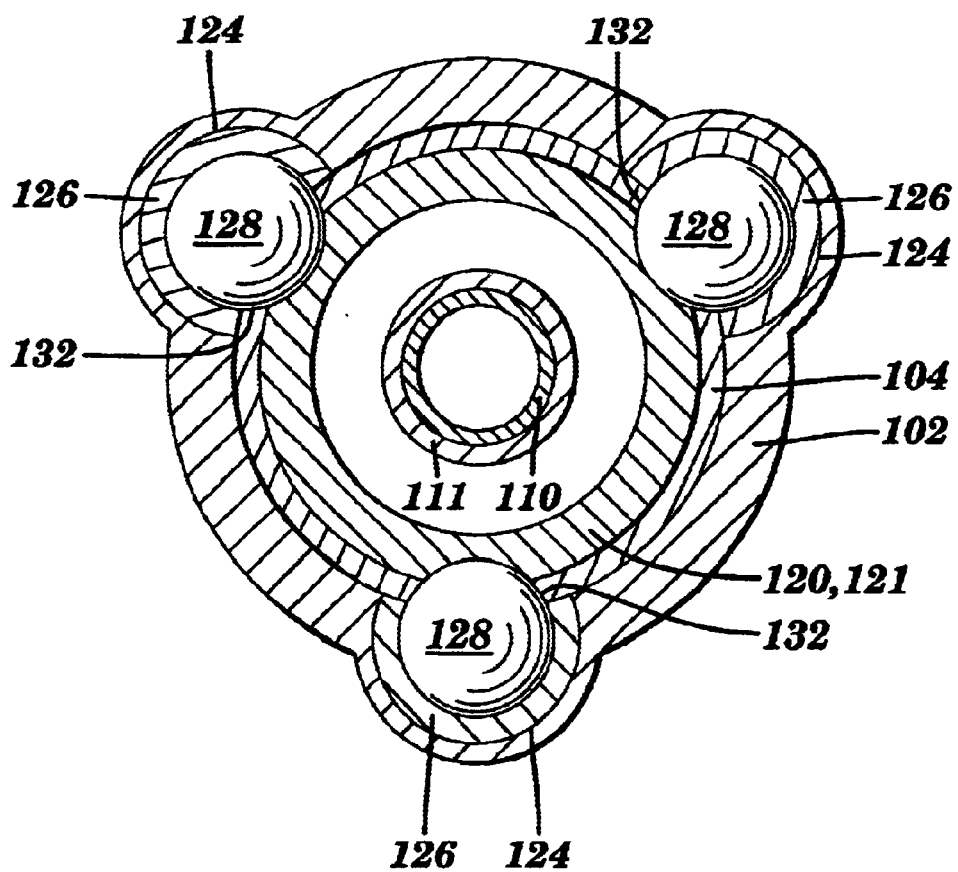
FIG. 3 shows a cross-sectional view of an alternative embodiment of part of the suspension/bearing of FIG. 1.
Figure 4:
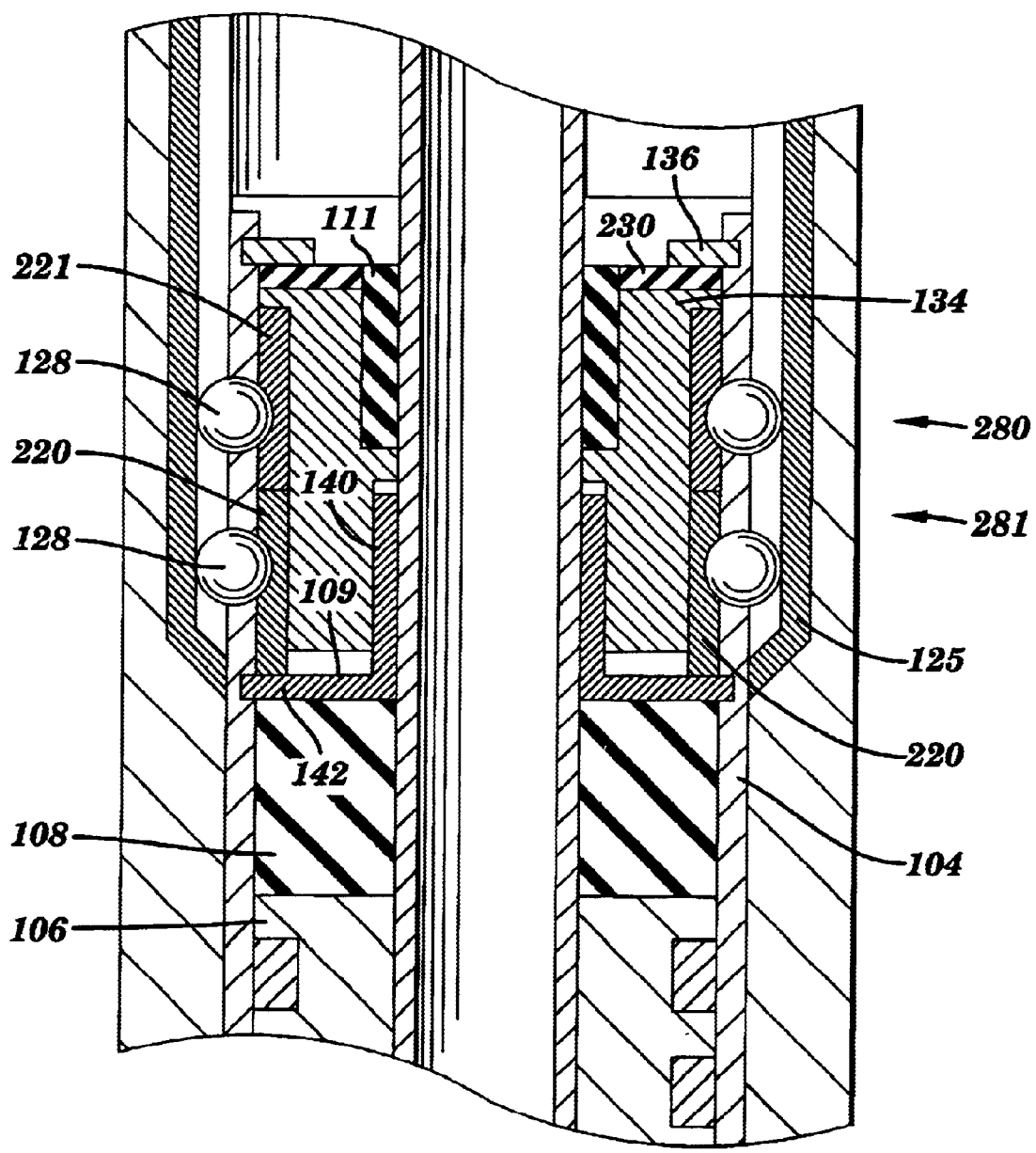
FIG. 4 shows a detailed cross-sectional view of a second embodiment of the suspension/bearing of FIG. 1.

As shown in FIGS. 1 and 3, bearing 180 includes a first outer sleeve or member 102 which telescopically receives a second inner sleeve or member 104. First and second members 102, 104 are slidable relative to one another and are preferably substantially tubular. In the setting of a suspension, first member 102 and second member 104 generally form a vehicle suspension or piston-cylinder shock absorber 181 including, inter alia, a piston head 106, elastomeric bumper 108, a collar fitting 109, piston stem 110, seals 111, rubberized bumper 112, closure 114, ground engaging member connection 116 and vehicle frame connection 118. Chambers 119 formed within members 102, 104 can be fluidly pressurized or contain compression springs as is known in the art to form a vehicle suspension 181, i.e, first member 102 becomes a cylinder and second member 104 becomes a rod of a suspension or shock absorber 181. Second member 104 includes a substantially smooth exterior surface that is sealed by seals 111 in first member 102. Hence, the suspension 181 does not require a rubber boot or cover.

First member 102 includes at least one, and preferably two, slots or bearing tracks 124 on an interior thereof. Each bearing track 124 is preferably a generally rounded opening on an interior surface of first member 102 and are shaped to complementarily receive a rolling element 128. Rolling elements 128 are preferably ball bearings. As shown, each bearing track 124 is linear. However, it is possible for each bearing track 124 to spiral, if desired. Each bearing track 124 may also preferably include a complementary bearing track race 126 to compensate for wear of each bearing track 124. In this setting, each bearing track 124 is shaped to accommodate a bearing track race 126. Each race 126 is shaped to complement the interior of a bearing track 124 on one side and to accommodate rolling elements 128 on another side. Each race 126 allows for increased longevity of bearing 180 because they are replaceable when they become worn. Each bearing track 124 extends from a first end 103 of first member 102 to an end point 125 distal a second end 105 of first member 102. End point 125 prevents the disassembly of suspension 181 as will be described below.

Second member 104 includes a set of first bearing openings 132 therein. Bearing openings 132 are shaped to receive, support and allow rotation of a rolling element 128 therein. Each bearing opening 132 is positioned in second member 104 to register with a bearing track 124 of first member 102 for reasons to be explained below.

Figure 10:
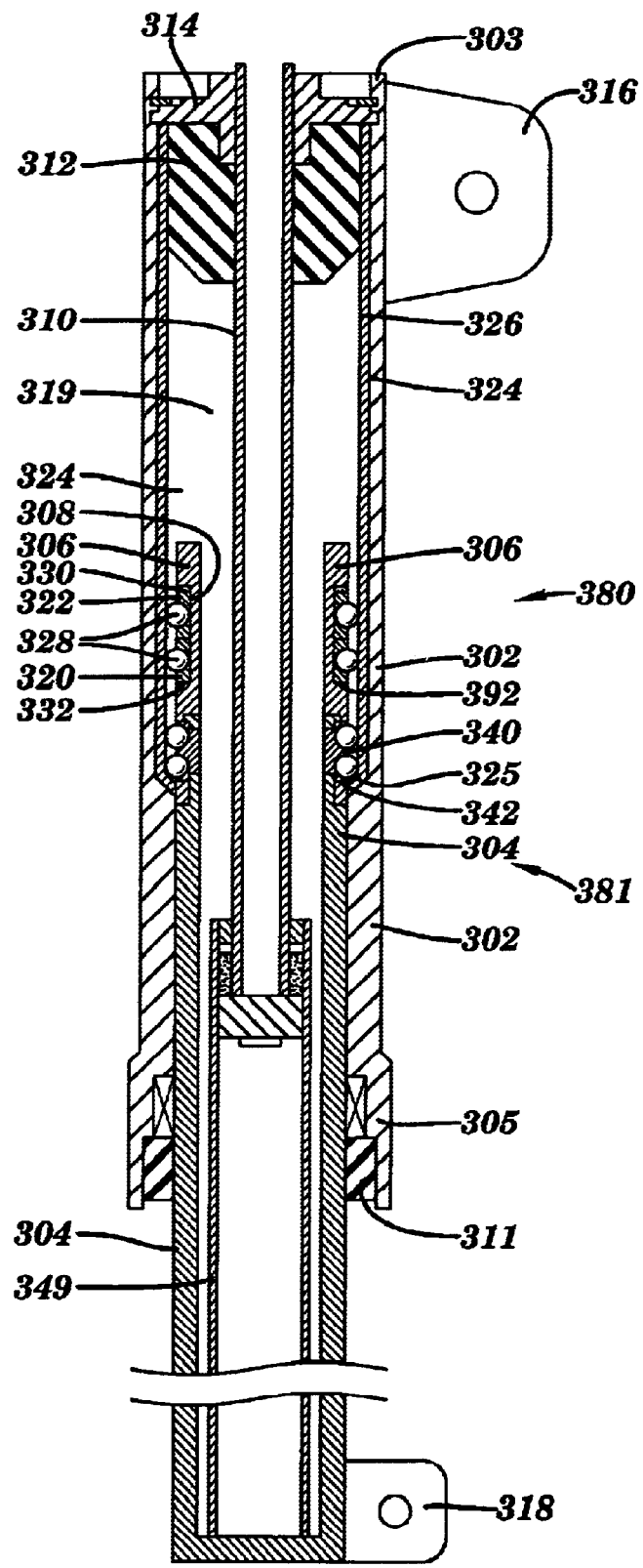
FIG. 10 shows a cross-sectional view of a third embodiment of the suspension/bearing.

As mentioned above, bearing 180 includes a collar 120 that provides for a more stable translational guide bearing. Collar 120, shown in detail in FIG. 10, is a generally tubular member having rolling element seats 122 positioned in an exterior surface 130. One seat 122 is positioned to register with each bearing opening 132/rolling element 128 of second member 104 for reasons to be explained below. Seats 122 are also shaped (e.g., rounded or cupped, etc.) to rotatably receive a rolling element 128 therein.

As shown in FIGS. 1 and 3, collar 120 is preferably concentrically positioned within second member 104. Collar 120 may be secured in a variety of ways, for instance, by welding collar 120 to second member 104. Alternatively, a collar holder or seat 134, shown in FIG. 1, may be provided to hold collar 120 within second member 104. Holder 134 is held in position by, e.g., a clip 136, welding, etc. Also, holding collar 120 in position is collar fitting 109. Fitting 109 includes a tubular portion 140 that mates and is slidable relative to piston stem 110 and a flanged portion 142 that is secured in place within second member 104, e.g., by keying (as shown), welding, etc.

Figure 9:
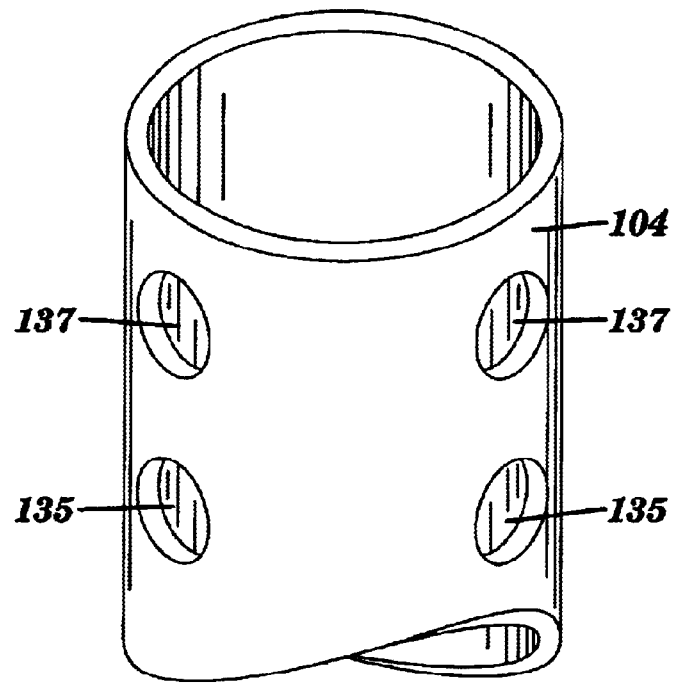
FIG. 9 shows a detail of a member shown in FIG. 8.

Bearing 180, as shown in FIG. 1, may also include a second collar 121 substantially identical to collar 120 and positioned adjacent thereto. Collar 121 could also be longitudinally spaced from collar 120 depending on allowable space. In this setting, bearing 180 includes a set of second bearing openings 133 in second member 104 in registration with each bearing track of first member 102, i.e., adjadent or longitudinally spaced from first bearing openings 132. Collar 121 is positioned in second member 104 in a similar fashion as that of collar 120 to have its seats 122 register with the set of second rolling element openings 133 in second member 104. If holder 134 and fitting 109 are used, they would also hold second collar 121, as shown in FIG. 9.

In operation, first member 102 and second member 104 telescope relative to one another. Rolling elements 128 are rotatably held in position in second member 104 and allowed to rotate with support from collar(s) 120, 121. As first and second member 102, 104 telescope, each bearing track race 126 within a bearing track 124 guides rolling elements 128 and prevents torquing of members 102, 104. Disassembly or dislodgement of second member 104 from first member 102 is prevented by engagement of rolling elements 128 with end point 125 of bearing tracks 124. When bearing 180 is used with a suspension 181, it thus provides a safer suspension 181 by improving slidability, preventing accidental disclodgement and resisting torque in suspenion members.

Referring to FIGS. 4–7, a second embodiment of a bearing 280 and suspension 281 is illustrated. In this setting, a compression mechanism 230 is positioned between collar holder 134 and clip 136. Compression mechanism 230 preferably is in the form of an elastomeric member but can take other forms such as a spring or spring system. Collar holder 134 and fitting 109 are shortened slightly at their normally abutting ends and clip 136 and fitting 109 are positioned such that compression mechanism 230 is compressed. This compression acts on fitting 109 and collar holder 134 to force fitting 109 and collar holder 134 towards one another. As a result, collars 220, 221 are also longitudinally forced together.

Figure 5:
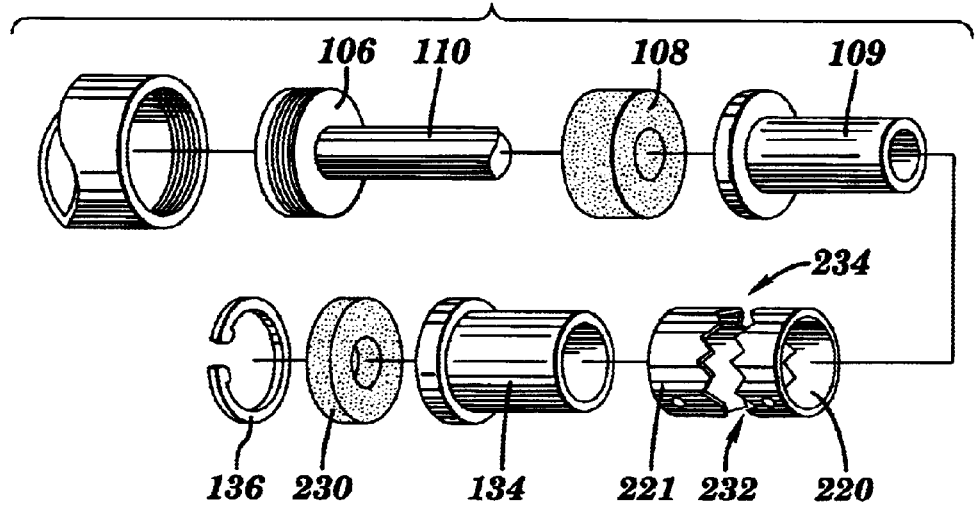
FIG. 5 shows an exploded view of the suspension/bearing of FIG. 1.
Figure 6:
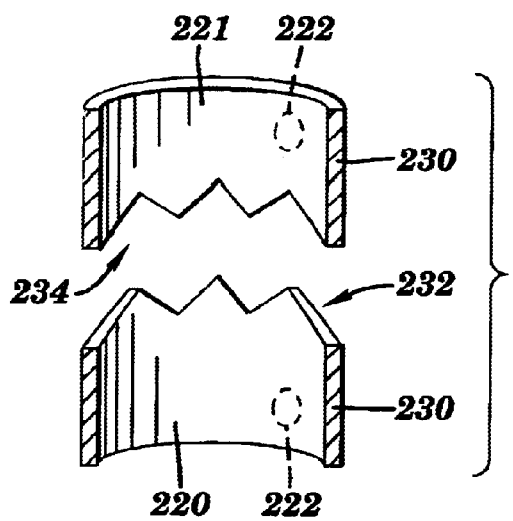
FIG. 6 shows a cross-sectional, isometric view of a collar pair of the suspension/bearing of FIG. 5.
Figure 7:
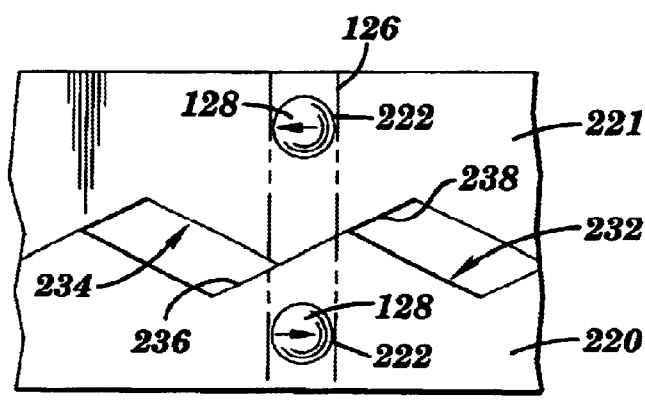
FIG. 7 shows a schematic view of the collar pair of FIG. 6 in engagement.

As shown in FIGS. 5–7, collars 220, 221 are modified to transform the longitudinal force acting on collars 220, 221 to a counteracting rotational force, which provides a more even wearing on each bearing track race 126. In order to create this counteracting rotational force, a rotational counteracting mechanism is employed. In one preferred embodiment, the rotational counteracting mechanism includes sawtooth edges 232, 234 on mating ends of collars 220, 221. As best shown in FIG. 7, sawtooth edges 232, 234 are positioned relative to one another such that an angled sliding surface 236 of sawtooth edge 232 slidingly mates with an angled sliding surface 238 of sawtooth edge 234. As the edges 232, 234 are pressed together, sliding surfaces 236, 238 slidingly mate to transform the longitudinal force into an opposing rotational force on collars 220, 221. This force is transferred to seats 222 and rolling elements 128. The effect is that rolling elements 128 are forced in opposing rotational directions as indicated by arrows in FIG. 7. The counteracting forces created provide a more even wearing on each bearing track race 126.

It should be recognized that mechanisms to create the counteracting rotational force other than the particular rotational counteracting mechanism disclosed above may be employed. For instance, an angled member (not shown) such as a spring, screw, piston, etc. that extends from one collar 220, 221 into the other collar 220, 221 to force them in opposing rotational directions, may be employed. Furthermore, sawtooth edges 232, 234 may also take other shapes, e.g., wavy, and not depart from the scope of the invention.

In the above embodiment, it will be recognized that the counteracting rotational force provides even wearing on each bearing track race 126 after bearing openings 132, 133 wear sufficiently to allow circumferential movement of the rolling elements 128 relative to second member 104.

Figure 8:
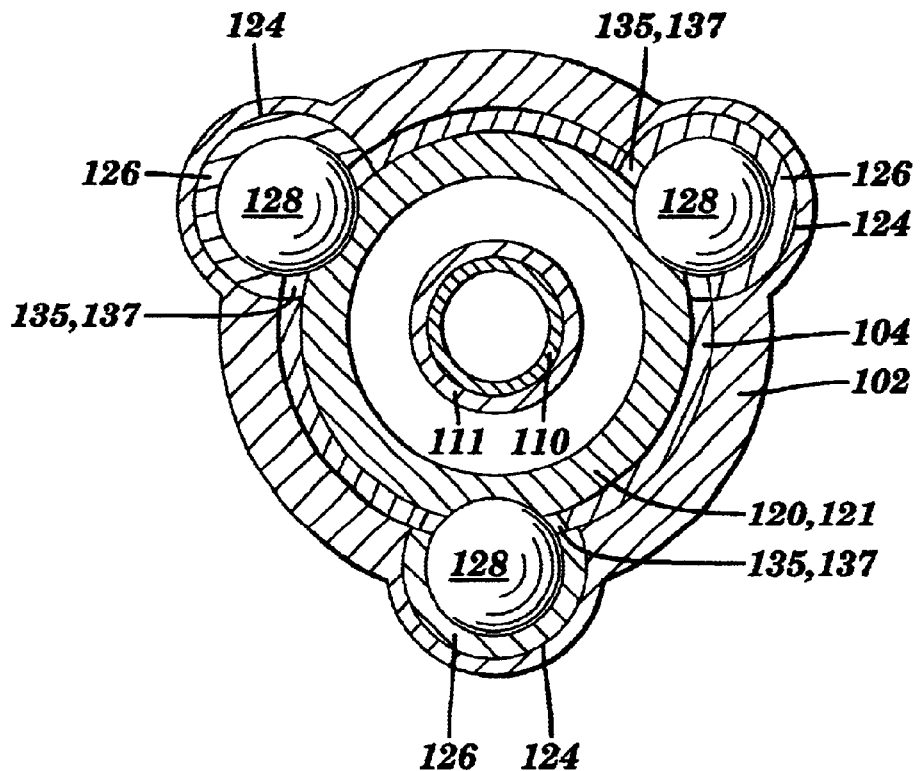
FIG. 8 shows a cross-sectional view of an alternative embodiment of part of the suspension/bearing of FIGS. 1 and 4.

Turning to FIGS. 8 and 9, an alternative embodiment of the bearing 180, 280 (FIGS. 1 and 4) including elongate openings 135, 137 is shown. In this setting, openings 135, 137 are elongated to allow for circumferential movement of the rolling elements 128 relative to second member 104. In this regard, the advantages of the counteracting force will be applicable when the bearing is constructed.

Hence, the bearing includes a first member 102 having a bearing track 126 for rotatably receiving at least two rolling elements 128, a second member 104 telescopically received in first member 102 and having at least two elongate openings 135, 137, a first collar 220 (FIGS. 4–7) positioned within second member 104 for rotatably supporting at least one rolling element 128, a second collar 221 (FIGS. 4–7) positioned within second member 104 for rotatably supporting at least one rolling element 128, a rolling element 128 extending through each elongate opening 135, 137 to be rotatably supported by one of first and second collars 220, 221 and engage bearing track 126, and a rotational counteracting mechanism 232, 234 (FIGS. 4–7) to force the first holder and the second holder in opposing rotational directions. Elongate openings 135, 137 may also be used in the FIG. 1 embodiment where no rotational counteracting mechanism is provided.

The above described bearing provides a system by which two members can be slidably mated and allow resistance to torque while also assuring slidability of its members and even wear by its rolling elements against mating members.

Turning to FIGS. 10–13, a third embodiment of a suspension 381 and a bearing 380 are illustrated. In this embodiment, bearing 380 provides a stable guide or translational bearing by the use of a holder 320, 322, described in more detail below. As with bearings 180, 280, bearing 380 is described in the setting of a vehicle suspension for illustrative purposes only, i.e., it has other uses beyond a vehicle suspension.

Figure 12:
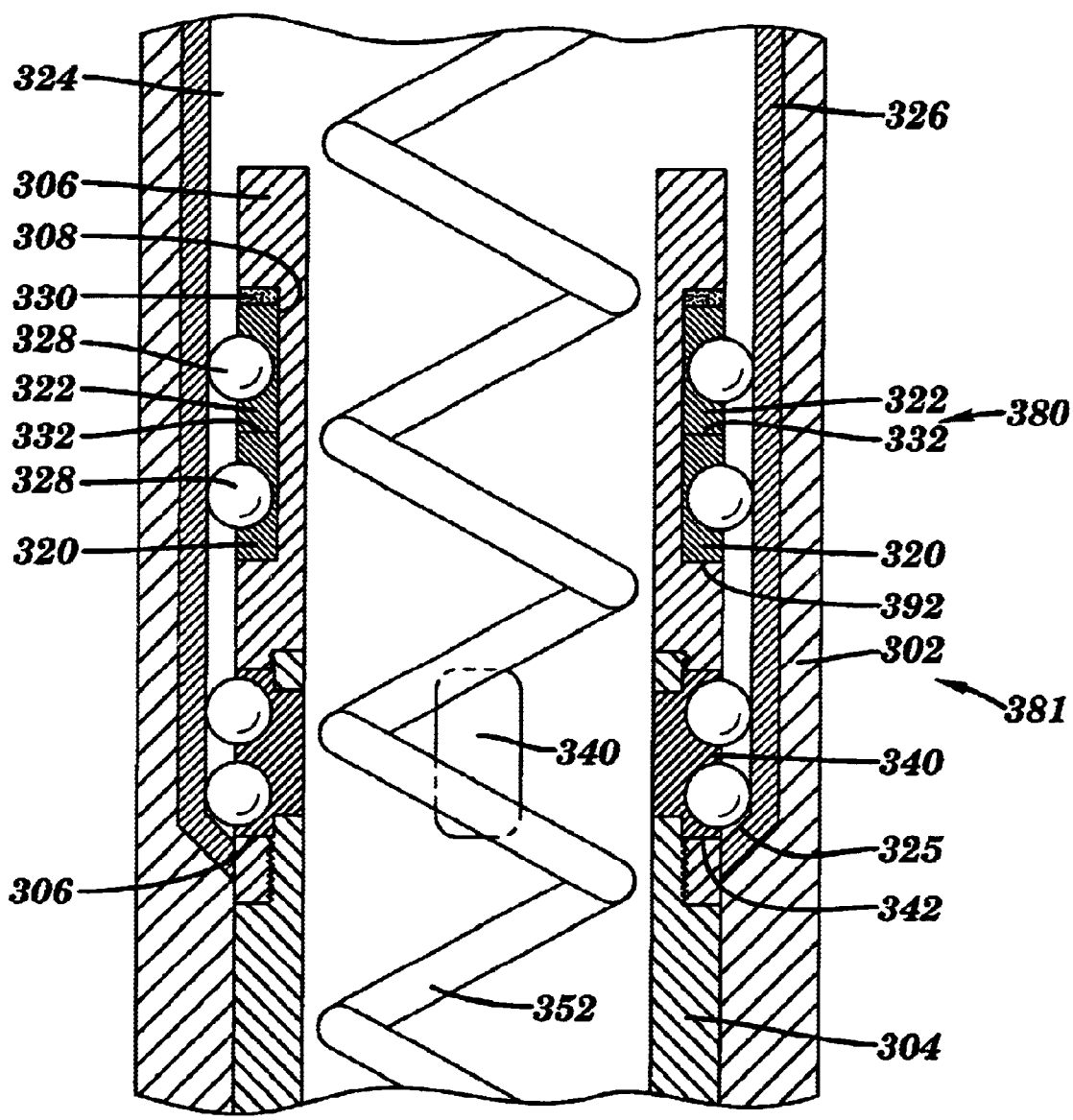
FIG. 12 shows an enlarged cross-sectional view of the suspension/bearing shown in FIG. 10.

As shown in FIGS. 10 and 12, bearing 380 includes a first outer sleeve or member 302 which telescopically receives a second inner sleeve or member 304. First and second members 302, 304 are slidable relative to one another and are preferably substantially tubular. In the setting of a suspension, first member 302 and second member 304 generally form a vehicle suspension 381 including, inter alia, a chamber 319 having a shock absorption system, a ground engaging member connection 316 and a vehicle frame connection 318. The shock absorption system may include a shock absorber 349 (FIG. 10)(with cylinder, rod and piston), a spring suspension element 352 (FIGS. 12 and 14A) or both a spring suspension element and shock absorber (FIG. 14B) therein. Alternatively, chamber 319 formed within members 302, 304 can be fluidly pressurized as is known in the art to form a vehicle suspension 381.

First member 302 includes at least one, and preferably two, slots or bearing tracks 324 and associated structure on an interior thereof, as discussed above relative to FIG. 3. Rolling elements 328 are preferably ball bearings. Turning to FIG. 11A, an alternative embodiment of a bearing track is shown. In this embodiment, a bearing track 424 is somewhat trapezoidally shaped. More specifically, bearing track 424 includes an outer surface 425 that may be flat, rounded or angled and two substantially radially extending side surfaces 427. Each bearing track 424 also includes a complementary bearing track race 426 having a shape to be firmly held in a bearing track 424. On an inwardly facing edge 429, each bearging track race 426 is shaped to receive a rolling element 328 to compensate for wear of each bearing track 424. While a particular shape has been illustrated to hold bearing track race 426 in place, it should be recognized that a variety of shapes are possible.

Figure 11B:
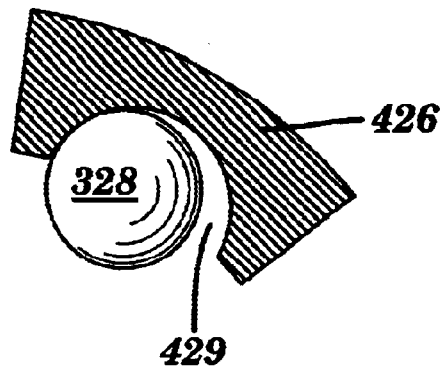
FIG. 11B shows a partial cross-sectional view of an alternative embodiment of a bearing track race.
Figure 11A:
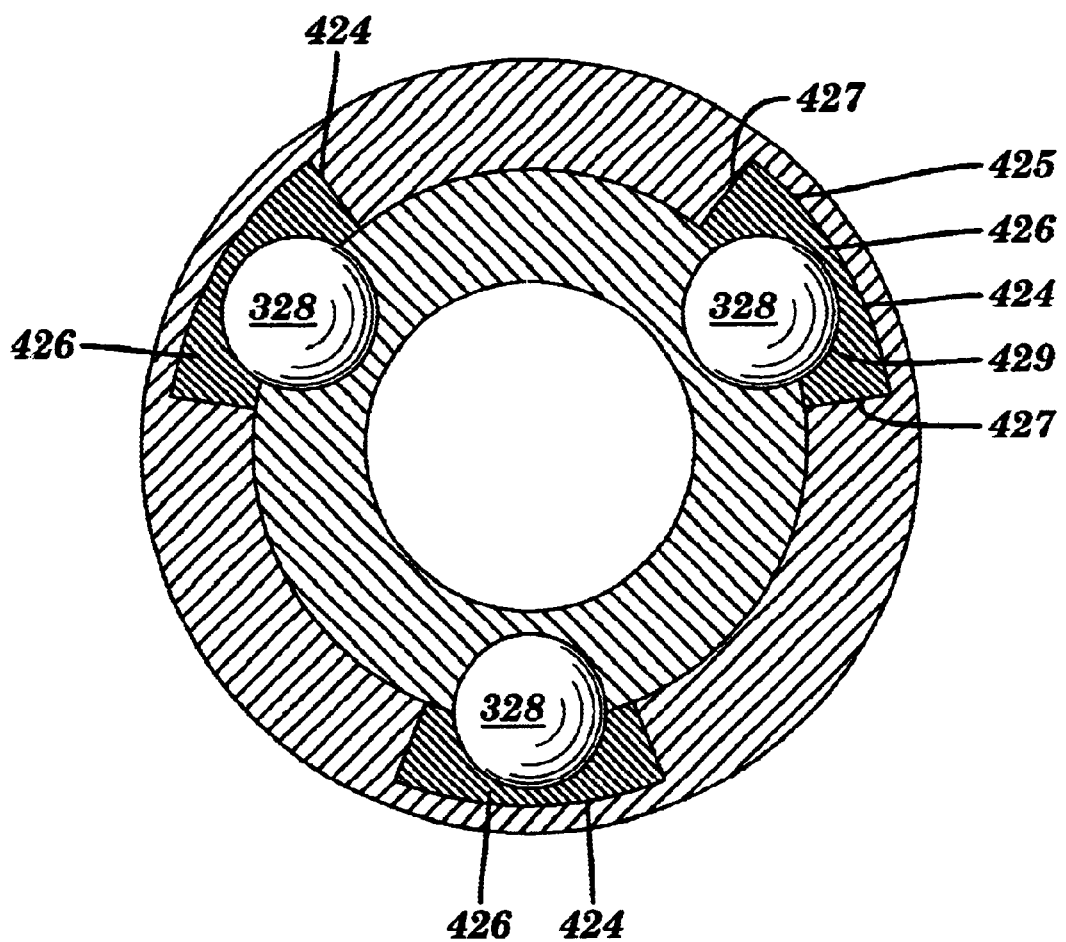
FIG. 11A shows a cross-sectional view of the suspension/bearing shown in FIG. 10.

FIG. 11B illustrates an alternative bearing track race in which a recess 429 is elongated. That is, recess 429 is elongated relative to a respective rolling element 328 and allows an element received therein a certain degree of side-to-side motion or "play" before resisting torque. This play may be advantageous where a user desires some controlled flex in the system. It should be recognized that where elongated recess 429 is used, elongated openings 135, 137 (FIGS. 8 and 9) would not be used.

Turning to the details of bearing 380, as shown in FIGS. 10 and 12, an extension member 306 is coupled to second member 304. As illustrated, extension member 306 includes internal threading that mates with external threading of first member 304. Extension member 306 may also be coupled to first member 304 by an slip or interference fit. Extension member 306 includes a rolling element holder recess 308 on an exterior surface thereof. A first rolling element holder 320 is seated in recess 308 for rotatably holding a rolling element 328 in registration with a bearing track 324, 424 of first member 302. A second rolling element holder 322 is also seated in recess 308 for rotatably holding a rolling element 328 in registration with bearing track 324, 424 of first member 302.

Holders 320, 322 includes means for transferring linear force applied between the first and second members to opposing rotational forces on associated rolling elements 328. A rotational counteracting mechanism may include sawtooth edges 332 on mating ends of holders 320, 322, similar to those shown in FIG. 7 on collars 220, 221. Surface 392 on the interior surface of recess 308 may be flat, or configured to include a rotational counteracting mechanism (e.g., sawteeth that mate with a complementary edge of holder 322). As shown, compression mechanism 330 is positioned between holder 320 and recess 308. Alternatively, compression mechanism may be positioned between holder 322 and recess 308. In another alternative, a compression mechanism may be placed between each holder 320, 322 and recess 308 to form a floating mechanism. Compression mechanism 330 preferably is in the form of an elastomeric member but can take other forms such as a spring or spring system.

Holders 320, 322 are sized such that compression mechanism 330 is compressed. This compression acts on holders 320, 322 to force the holders towards one another. As the sawtooth edges are pressed together, the sliding surfaces slidingly mate to transform the longitudinal force into an opposing rotational force on holders 320, 322. This force is transferred to rolling elements 328. The effect is that rolling elements 328 are forced in opposing rotational directions as indicated by arrows in FIG. 7. The counteracting forces created provide a more even wearing on each bearing track race 326.

It should be recognized that other mechanisms to create the counteracting rotational force other than the particular rotational counteracting mechanism disclosed above may be employed. For instance, an angled member (not shown) such as a spring, screw, piston, etc. that extends from one holder 320, 322 into the other holder to force them in opposing rotational directions, may be employed. Furthermore, sawtooth edges may also take other shapes, e.g., wavy, and not depart from the scope of the invention.

Figure 13:
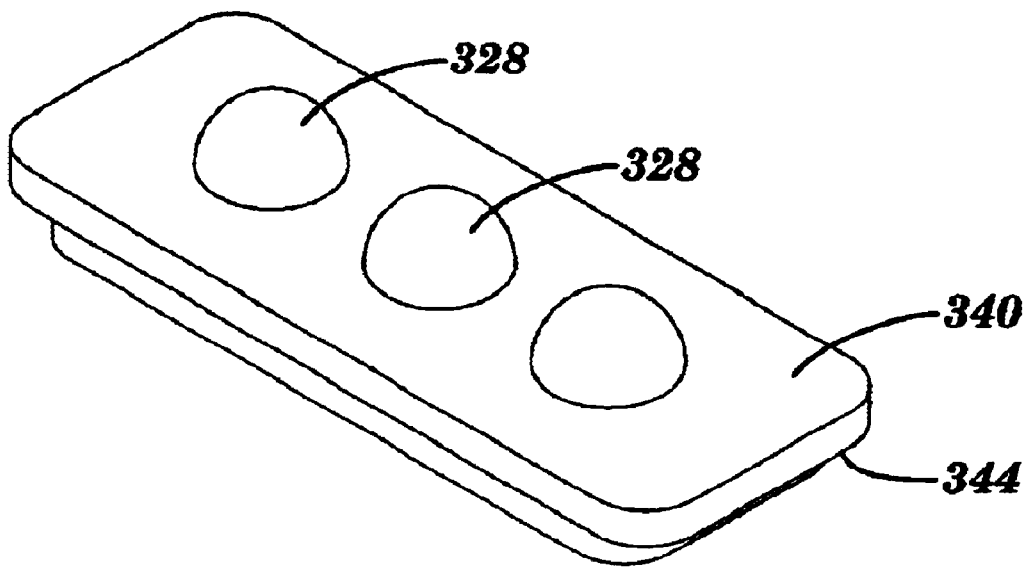
FIG. 13 shows an isometric view of a component shown in FIG. 12.

In addition to holders 320, 322, the embodiment of FIGS. 10 and 12 also includes a third rolling element holder 340 for rotatably holding rolling element(s) 328 aligned with a guide track 324. As indicated above, second member 304 and extension member 306 are threadably connected (or slip or interference fit together). As shown best in FIG. 12, holder 340 is preferably positioned in a holder recess 342 that extends through extension member 306 and at least a portion of second member 304. As shown in FIG. 13, holder 340 includes a stepped edge 344 for radially positioning the holder relative to members 304, 306. Recess 342 is sized to mate with stepped edge 344 and secure holder 340. In addition, recess 342 is positioned to register rolling element(s) 328 with guide track(s) 324. Holder 340 provides further guidance for the telescopic movement of first and second member 302, 304. In addition, holder 304 provides additional resistance to torque between members 302, 304.

Figure 14A:
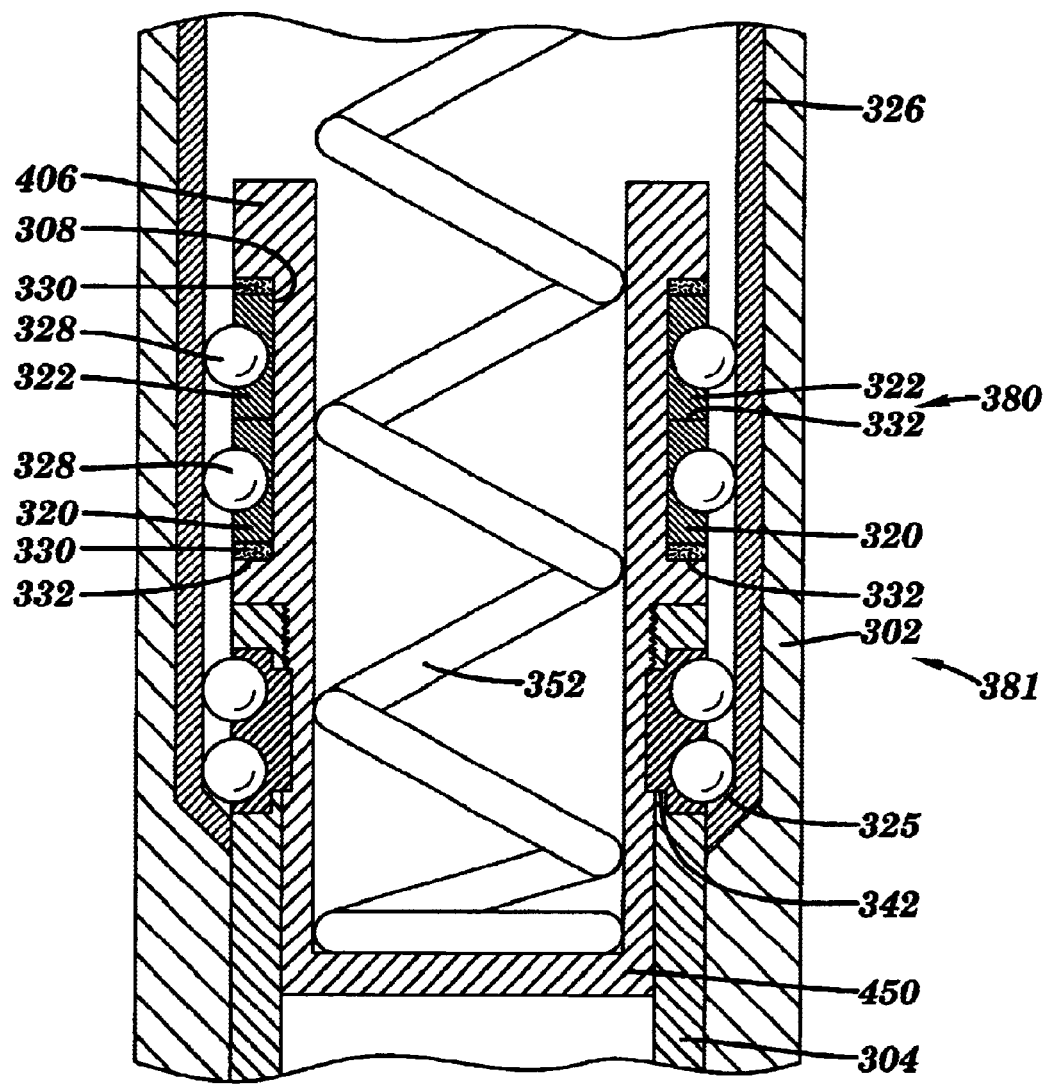
FIGS. 14A–B show a cross-sectional view of an alternative embodiment of the suspension/bearing of FIGS. 10 and 12.

Turning to FIG. 14A, an alternative embodiment of bearing 380 is shown. In this embodiment, an extension member 406 includes internal threading that mates with external threading of first member 304. As discussed above, extension member 406 may be alternatively coupled to first member 304 by a slip or interference fit with extension member 406 being the innermost member. With either construction, extension member 406 can now include a spring seat 450 that is positioned within first member 304. A spring suspension element 352 may be placed in spring seat 450 to provide cushioning for a suspension 381. As an alternative, the chamber formed by spring seat 450 may be fluidly pressurized as known in the art to provide cushioning.

Figure 14B:
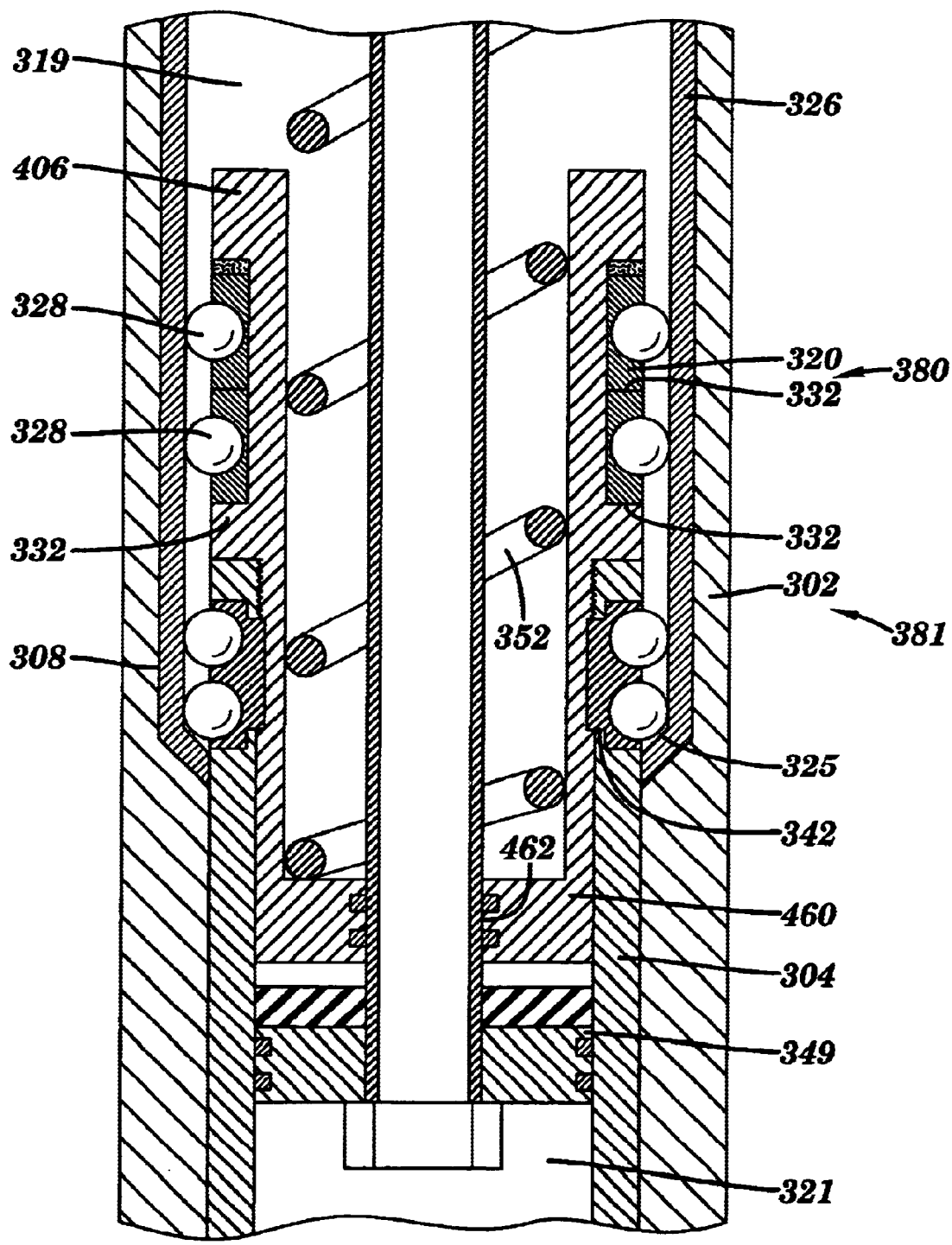

FIG. 14B illustrates an alternative embodiment of a spring seat 460. In this setting, spring seat 460 includes a rod passage opening 462 for the rod of a shock absorber 349. A piston 464 of the shock absorber can be seated in a chamber 321 in second member 304 formed on an opposing side of spring seat 460. With regard to providing both a spring suspension element 352 and shock absorber 349, it should be recognized that other positioning is possible. For instance, a spring suspension element may be positioned about shock absorber 349 as illustrated in FIG. 10.

FIGS. 14A–B also illustrates recess 342 extending through first member 304 and at least a portion into extension member 406.

The above described bearing 380 provides a system by which two members can be slidably mated and allow resistance to torque while also assuring slidability of its members and even wear by its rolling elements against mating members. In addition, the embodiments of FIGS. 10–14 allow for easier construction and replacement of parts. Further, these embodiments provide additional torque resistance and slidability by providing additional rolling elements.

In operation, first member 302 and second member 304 telescope relative to one another. Rolling elements 328 are rotatably held in position in second member 304 and allowed to rotate with support from holder(s) 320, 322. As first and second member 302, 304 telescope, each bearing track race 326 within a bearing track 324 guides rolling elements 328 and prevents torquing of members 302, 304. Disassembly or dislodgement of second member 304 from first member 302 is prevented by engagement of rolling elements 328 with end point 325 of bearing tracks 324. When bearing 380 is used with a suspension 381, it thus provides a safer suspension 381 by improving slidability, preventing accidental disclodgement and resisting torque in suspension members.

Figure 15:
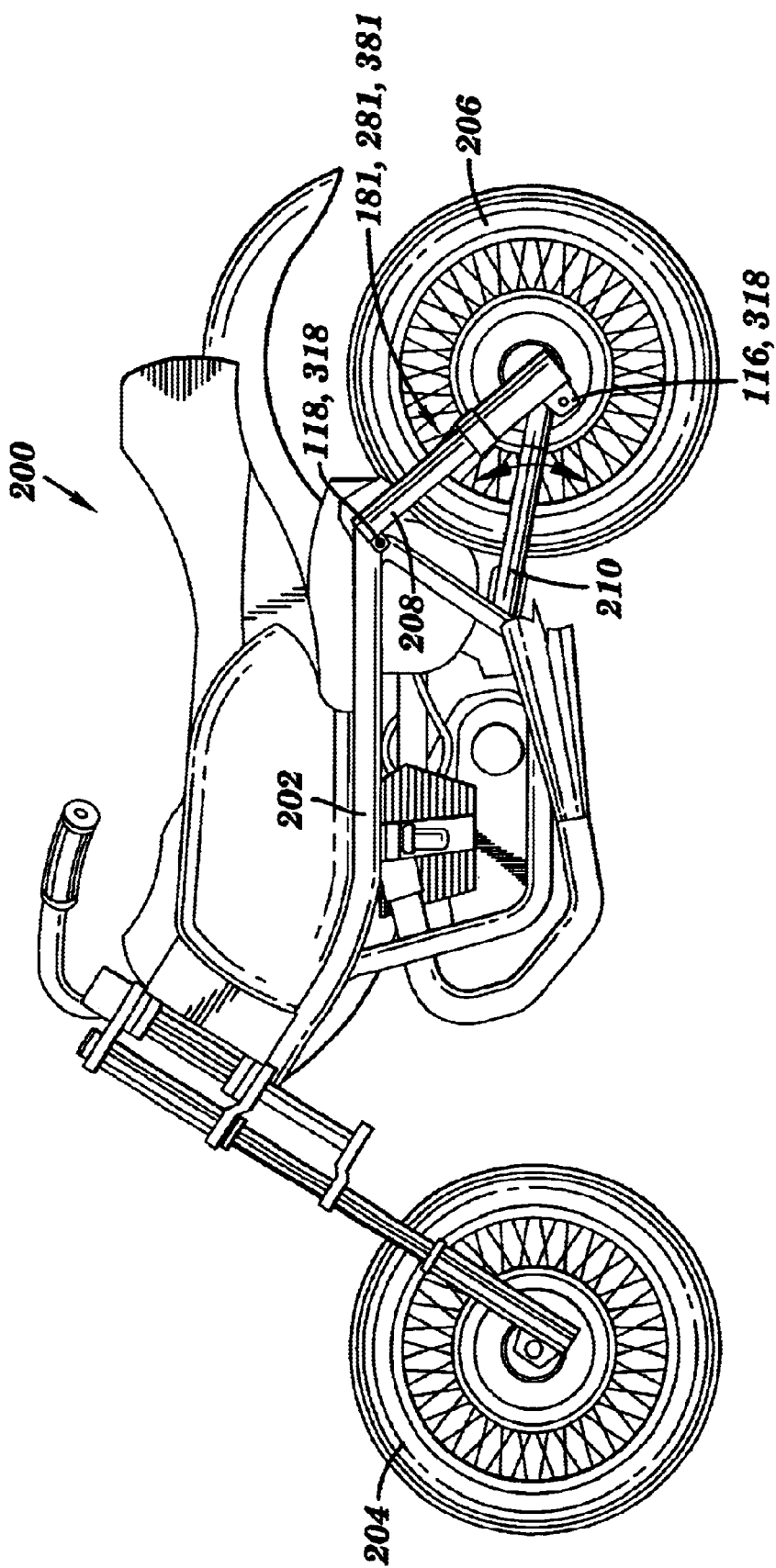
FIG. 15 shows a vehicle incorporating the suspension of FIGS. 1, 8, 11 or 14.

Referring to FIG. 15, a vehicle 200 incorporating a vehicle suspension 181, 281, 381 in accordance with the invention is disclosed. Vehicle 200 includes a vehicle frame 202 having at least one ground engaging member 204, 206. As shown, suspension 181, 281, 381 is coupled to a stationary member 208 by vehicle frame connection 118, 318 and a pivotal rocker arm 210 by connection 116, 318. Pivotal rocker arm 210 is coupled to ground engaging member 204. Suspension 181, 381 cushions the undulations experienced by ground engaging member 204 and rocker arm 210 during movement of vehicle 200.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

In particular, while the present invention has been described in conjunction with a rear fork of a two wheeled vehicle, it is not to be limited to a motorcycle or bicycle suspension. As should be self-evident, the present invention can be utilized on any ground engaging member of a vehicle (e.g., wheel, ski, track, etc.), front or back, on any vehicle without departing from the general teachings of the invention.

It should be recognized that the number of rolling elements, bearing tracks, bearing track races, and bearing openings (elongate and otherwise) around the first and second members may vary. For instance, FIG. 1 shows two sets equidistantly spaced around members 102, 104, while FIG. 3 shows three sets equidistantly spaced around members 102, 104. Furthermore, while the rolling elements have been disclosed as ball bearings, it is possible that they take other forms, e.g., a cylindrical or tapered roller, a needle roller, etc. This, obviously, assumes alterations are made to the first and second members, the bearing tracks, the bearing track races, collars and/or holders to accommodate the different rolling elements. It is also envisioned that collar(s) 120, 121 could be integrally formed with member 104, if desired. Further, while the bearings are preferably made of a metallic material, it should be recognized that other materials, such as hard plastics could be used.

Relative to compression mechanism 230 or 330, it should be recognized that other mechanisms can be used to provide compression and retention. For instance, the compression mechanism could be a spring or spring system. Clip 136 could also be replaced, for example, by a threaded plug matable with the end of second member 104. Further, collar holder 134 (FIG. 1) and fitting 109 may take a variety of different forms and still provide the collar seating and compression surfaces necessary to force collars 220, 221 together.

What is claimed is:

1. A bearing comprising:
   a first member having at least one bearing track, each bearing track adapted to rotatably guide a rolling element received therein;
   a second member telescopically arranged with the first member;
   an extension member coupled to the second member, the extension member including a first recess;
   a first rolling element holder seated in the first recess for rotatably holding a first rolling element in registration with a bearing track of the first member;
   a second rolling element holder seated in the first recess for rotatably holding a second rolling element in registration with a bearing track of the first member; and
   means for transferring linear force applied between the first and second members to opposing rotational forces on the first and second rolling elements.

2. The bearing of claim 1, wherein the first recess is concentrically positioned about the extension member.

3. The bearing of claim 1, wherein each bearing track includes a rounded opening on an interior of the first member.

4. The bearing of claim 1, wherein each bearing track includes a complementary bearing track race to receive a rolling element and compensate for wear of the bearing track.

5. The bearing of claim 4, wherein each bearing track race includes a recess that is elongated relative to a respective rolling element.

6. The bearing of claim 1, wherein the rolling elements are ball bearings.

7. The bearing of claim 1, wherein the first member has a first end and a second end and each bearing track extends from the first end to an end point distal the second end.

8. The bearing of claim 7, wherein the second member is prevented from sliding out of the first member by a rolling element engaging the end point of a bearing track.

9. The bearing of claim 1, further comprising:
   a second recess positioned in the second member; and
   a third rolling element holder positioned in the second recess for rotatably holding a third rolling element in registration with a bearing track of the first member.

10. The bearing of claim 9, wherein the second recess extends into at least a portion of the extension member.

11. The bearing of claim 1, wherein the extension member includes a spring seat positioned within the first member.

12. The bearing of claim 11, further comprising a spring positioned in the spring seat.

13. The bearing of claim 11, further comprising a shock absorber positioned within the first and second members, wherein the spring seat includes an opening for passage of a rod of the shock absorber.

14. A vehicle suspension adapted to be coupled to a ground engaging member comprising:
    a first member having at least one bearing track, each bearing track adapted to rotatably guide a rolling element received therein;
    a second member telescopically arranged with the first member;
    an extension member coupled to the second member, the extension member including a first recess;
    a first rolling element holder seated in the first recess for rotatably holding a first rolling element in registration with a bearing track of the first member;
    a second rolling element holder seated in the first recess for rotatably holding a second rolling element in registration with a bearing track of the first member; and
    means for transferring linear force applied between the first and second members to opposing rotational forces on the first and second rolling elements,
    wherein one of the first and second members is coupled to the ground engaging member and the other member is coupled to a frame of a vehicle.

15. The vehicle suspension of claim 14, wherein the recess is concentrically positioned about the extension member.

16. The vehicle suspension of claim 14, wherein each bearing track is a rounded opening on an interior of the first member.

17. The vehicle suspension of claim 14, wherein each bearing track includes a complementary bearing track race to receive a rolling element and compensate for wear of the bearing track.

18. The vehicle suspension of claim 17, wherein each bearing track race includes a recess that is elongated relative to a respective rolling element.

19. The vehicle suspension of claim 14, wherein the rolling elements are ball bearings.

20. The vehicle suspension of claim 14, wherein the first member has a first end and a second end and each bearing track extends from the first end to an end point distal the second end.

21. The vehicle suspension of claim 20, wherein the second member is prevented from sliding out of the first member by a rolling element engaging the end point of a bearing track.

22. The vehicle suspension of claim 14, further comprising:
    a second recess positioned in the second member; and
    a third rolling element holder positioned in the second recess for rotatably holding a third rolling element in registration with a bearing track of the first member.

23. The vehicle suspension of claim 22, wherein the second recess extends into at least a portion of the extension member.

24. The vehicle suspension of claim 14, wherein the extension member includes a spring seat positioned within the first member.

25. The vehicle suspension of claim 24, further comprising a spring positioned in the spring seat.

26. The vehicle suspension of claim 24, further comprising a shock absorber positioned within the first and second members,
wherein the spring seat includes an opening for passage of a rod of the shock absorber.

27. A bearing comprising:
 a stationary outer member having at least two bearing tracks on an interior of the stationary outer member;
 a bearing track race received in each bearing track to compensate for wear of the bearing track and rotatably guide a rolling element received therein;
 a moving inner member telescopically arranged with the stationary outer member;
 an extension member coupled to the moving inner member
 the extension member having a first recess in an exterior surface thereof;
 a first rolling element holder seated in the first recess for rotatably holding a first rolling element in registration with each bearing track of the stationary outer member,
 a second rolling element holder seated in the first recess for rotatably holding a second rolling element in registration with each bearing track of the stationary outer member; and
 means for transferring linear force applied between the stationary and moving members to opposing rotational forces on the first and second rolling elements.

28. The bearing of claim 27, wherein the stationary outer member and moving inner member are substantially tubular.

29. A bearing comprising:
 a first member having a bearing track for rotatably receiving at least two rolling elements;
 a second member telescopically received in the first member and having at least two elongate openings;
 a first collar positioned within the second member for rotatably supporting at least one rolling element;
 a second collar positioned within the second member for rotatably supporting at least one rolling element;
 each elongate opening including a rolling element extending therethrough, each rolling element being rotatably supported by one of the first and second collars to engage the bearing track; and
 a rotational counteracting mechanism to force the first collar and the second collar in opposing rotational directions.

30. The bearing of claim 27, wherein the rotational counteracting mechanism includes:
 a first angled sliding surface on an end of the first collar;
 a second angled sliding surface on an end of the second collar that is slidingly matable with the first angled sliding surface;
 a compression mechanism to apply a longitudinal force to the first and second collars to force them longitudinally together; and
 wherein the first sliding surface and second sliding surface slidingly mate to transform the longitudinal force into a counteracting rotational force.

* * * * *